March 31, 1925.
W. P. WITHERS
1,531,776
CONNECTER LINK FOR TIRE CHAINS
Filed March 20, 1924
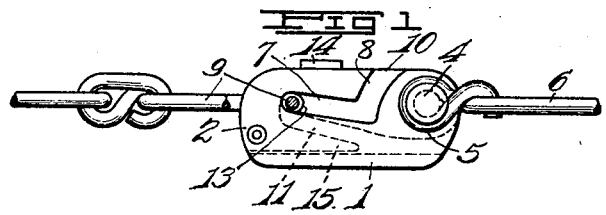
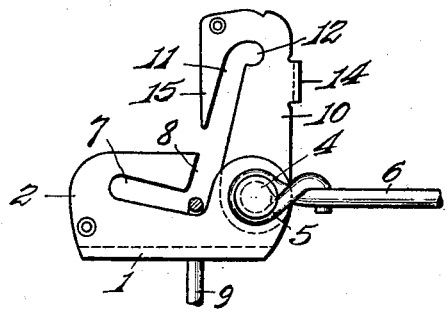
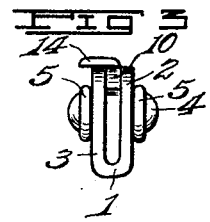
INVENTOR
W. P. Withers.
By N. E. Dunlap
ATTORNEY Patented Mar. 31, 1925.

1,531,776

UNITED STATES PATENT OFFICE.

WILLIAM PAYTON WITHERS, OF GRAFTON, WEST VIRGINIA.

CONNECTER LINK FOR TIRE CHAINS.

Application filed March 20, 1924. Serial No. 700,453.

*To all whom it may concern:*

Be it known that I, WILLIAM PAYTON WITHERS, a citizen of the United States of America, and resident of Grafton, county of Taylor, and State of West Virginia, have invented certain new and useful Improvements in Connecter Links for Tire Chains, of which the following is a specification.

This invention relates broadly to chain fasteners, and more specifically to a connecter for tire chains.

The primary object of the invention is to provide a connecter for the meeting ends of tire chains, which, while readily and conveniently operable to and from its open position for the introduction or removal of a link of the free end of the chain, is effectually maintained against chance opening by the link which is received thereby.

A further object is to provide a simple, inexpensive and efficient connecter of the character mentioned, the same having a form which practically insures its retaining closed position, thus effectually guarding against the release and loss of the chain by which it is carried.

In describing the invention in detail, reference is herein had to the accompanying drawings, in which—

Figure 1 is a side elevation of the invention with its members disposed in closed chain-fastening position;

Figure 2 is a similar elevation, showing the invention with its members in open position; and—

Figure 3 is an end elevation of the invention.

Referring to said drawings, 1 indicates generally a connecter which consists of two similarly shaped members 2 and 3 formed from a single sheet metal blank, the same being doubled along a median longitudinal line to dispose said members in parallel spaced relation. One end of said connecter has directed transversely through the parallel members thereof a pin 4, headed at both ends, to the opposite end portions of which are permanently attached the terminal loops 5 of the end link 6 of the tire chain.

Provided in each of the connecter members 2 and 3 is a link-receiving slot 7 which is in open communication at its rear end— the end adjacent to the pin 4—with a slot or passageway 8 which leads outward at a suitable angle through the lateral edge portion of the member, said passageway constituting an entrance slot through which may be introduced the terminal link 9 of the free end of the chain. The said slot 7 is inclined to the extent that its rear end is located below the line of stress imposed on the connecter between the front end of said slot and the pin 4.

Mounted upon the pin 4 as a pivot is a retainer 10 adapted to cooperate with the connecter for retaining in place the link 9 of the free end of the chain. Said retainer is of flat plate-like form and is movable in jack-knife fashion to and from its closed chain-retaining position between the connecter members 2 and 3. Extending into said retainer from its lower edge is an upwardly and forwardly inclined slot 11 which opens at its inner end into a link-receiving recess 12 located above the line of said slot. Said recess is so positioned in the retainer that, when the latter occupies closed position, said recess accurately registers with the inner end portions of the slots 7 and, consequently, cooperates with, or complements, said end portions in the formation of a link-receiving eye, as shown at 13 in Fig. 1. From the foregoing, it will be readily apparent that, in said closed position of the retainer, the slot 11 of said retainer is located below or out of register with, the slots 7 of the connecter.

To introduce the terminal link 9, the retainer 10 is first swung back on its pivot pin 4 to approximately the position shown in Fig. 2, whereupon the link is inserted through the entrance slots 8 of the connecter members to a position at the rear end of the slots 7. Then, maintaining said link positioned at the said rear end of the slots 7, the retainer is closed upon said link, bringing the slot 11 thereof into substantial register with the slots 7 whereupon said link is moved forward along said slots 7 and 11 until it reaches the recess 12, at which point in the closing of the device said retainer drops to its fully closed position, shown in Fig. 1.

A lip 14 formed integral with the retainer at a suitable point on the upper edge portion thereof projecting laterally over the corresponding edge of one of the connecter members serves as a finger piece whereby said retainer may be grasped for effecting opening movement of the latter. In releasing or detaching the link 9 the retainer is initially elevated to a point at which the slots 7 and 11 are brought into substantial register, allowing the link to be forced rearwardly to a point at which it frees the hook-like bill 15 of the retainer to the extent that the latter is permitted to pass by said link in the opening movement of the retainer. The retainer being swung away from the connecter, said link is removed through the slots 8.

It will be understood that, due to the inclined arrangement of the slots 7 and 11 of the connecter and the retainer, respectively, and to the provision of the link-receiving recess at a point which allows the retainer to assume a closed position in which its slot 11 is out of register with the slots 11 of the connecter, chance retraction of the link 9 to a point at which it will permit the opening of the retainer is effectually prevented.

What is claimed is—

A connecter link for tire chains, comprising a pair of similarly shaped connecter members disposed in parallel spaced relation and permanently connected at their rear ends to an end of the chain, each of said connector members having therein an upwardly and forwardly inclined slot communicating at its rear end with an angularly disposed entrance slot, and a retainer pivotally mounted between the rear end portions of said members, said retainer being movable in jack-knife fashion to and from a closed position between said members, said retainer having therein an upwardly and forwardly inclined slot terminating at its front end in an angularly related recess, the slot of said retainer being adapted in one position of the latter to lie in substantial register with the slots of said connecter members, and also being adapted in its fully closed position to lie below the slots of said members.

In testimony whereof, I affix my signature in presence of two subscribing witnesses.

WILLIAM PAYTON WITHERS.

Witnesses:
    A. C. MORRIS,
    M. C. BALYARD.